US010780373B2

(12) United States Patent
Fujieda et al.

(10) Patent No.: US 10,780,373 B2
(45) Date of Patent: Sep. 22, 2020

(54) HOLLOW FIBER DEGASSING MODULE, AND METHOD OF DEGASSING LIQUID USING SAID HOLLOW FIBER DEGASSING MODULE

(71) Applicant: DIC Corporation, Tokyo (JP)

(72) Inventors: Shigeaki Fujieda, Chiba (JP); Kazumi Oi, Chiba (JP); Youhei Suganuma, Chiba (JP)

(73) Assignee: DIC CORPORATION, Tokyo (JP)

( * ) Notice: Subject to any disclaimer, the term of this patent is extended or adjusted under 35 U.S.C. 154(b) by 134 days.

(21) Appl. No.: 16/311,613

(22) PCT Filed: Jun. 28, 2017

(86) PCT No.: PCT/JP2017/023708
§ 371 (c)(1),
(2) Date: Dec. 19, 2018

(87) PCT Pub. No.: WO2018/003840
PCT Pub. Date: Jan. 4, 2018

(65) Prior Publication Data
US 2019/0255464 A1 Aug. 22, 2019

(30) Foreign Application Priority Data

Jun. 30, 2016 (JP) .................................. 2016-130736

(51) Int. Cl.
*B01D 19/00* (2006.01)
*B01D 63/02* (2006.01)
*B01D 61/00* (2006.01)

(52) U.S. Cl.
CPC ......... *B01D 19/0031* (2013.01); *B01D 19/00* (2013.01); *B01D 61/00* (2013.01); *B01D 63/02* (2013.01); *B01D 2313/04* (2013.01)

(58) Field of Classification Search
CPC ............ B01D 19/0031; B01D 19/0036; B01D 19/0094; B01D 2313/23; B01D 2319/04; B01D 2319/06; B01D 63/021; B01D 63/026; B01D 63/04
See application file for complete search history.

(56) References Cited

FOREIGN PATENT DOCUMENTS

| JP | H03-118802 A | 5/1991 |
| JP | 11-005024 A | 1/1999 |
| JP | 2008-516751 A | 5/2008 |
| KR | 10-2015-0091891 A | 8/2015 |
| WO | 2006/044255 A2 | 4/2006 |
| WO | 2007/063720 A1 | 6/2007 |

OTHER PUBLICATIONS

International Preliminary Report and Written Opinion issued in corresponding to International Patent Application No. PCT/JP2017/023708, dated Jan. 10, 2019.
International Search Report issued in corresponding International Patent Application No. PCT/JP2017/023708, dated Aug. 15, 2017, with English Translation.

*Primary Examiner* — Sharon Pregler
(74) *Attorney, Agent, or Firm* — McDermott Will & Emery LLP

(57) ABSTRACT

A hollow fiber degassing module includes: a cylinder; a first lid having a liquid supply port; a second lid; a liquid inflow portion that includes a cylindrical main body being in communication with the liquid supply port inside the cylinder; a hollow fiber membrane bundle that is provided inside the cylinder and that includes multiple hollow fiber membranes; a liquid outlet; a first air outlet that is provided to any one of the first lid and the second lid and connected to the inside of the hollow fiber membranes; and a bubble outlet that is provided to the cylinder.

11 Claims, 5 Drawing Sheets

US 10,780,373 B2

HOLLOW FIBER DEGASSING MODULE, AND METHOD OF DEGASSING LIQUID USING SAID HOLLOW FIBER DEGASSING MODULE

CROSS REFERENCE

This application is the U.S. National Phase under 35 U.S.C. § 371 of International Application No. PCT/JP2017/023708, filed on Jun. 28, 2017, which claims the benefit of Japanese Application No. 2016-130736, filed on Jun. 30, 2016, the entire contents of each are hereby incorporated by reference.

TECHNICAL FIELD

The present invention relates to a hollow fiber degassing module and a method for degassing a liquid with the hollow fiber degassing module.

BACKGROUND ART

Some liquids contain gas dissolved therein, such as air. In the case where a liquid that is to be analyzed, for example, contains a dissolved gas, a result of the analysis becomes inaccurate because of the dissolved gas in some cases. In addition, use of an ink, resist, or coating material that contains a dissolved gas may result in the occurrence of defective printing or another problem. Patent Literature 1, for instance, discloses that a hollow fiber degassing module using hollow fiber membranes is attached to an ink channel extending from an ink reservoir to an ink jet head. In the disclosure of Patent Literature 1, the hollow fiber degassing module enables continuous degassing of ink.

CITATION LIST

Patent Literature

PTL 1: International Publication No. WO2007/063720

SUMMARY OF INVENTION

Technical Problem

In the above-mentioned hollow fiber degassing module, a dissolved gas and fine bubbles contained in a liquid enters the inside of the hollow fiber membranes through pores formed in the surfaces of the hollow fiber membranes. In the case where a bubble that is greatly larger than the pores of the hollow fiber membranes exists in a liquid, such a bubble does not enter the hollow fiber membranes in some cases. In this case, the liquid discharged from the hollow fiber degassing module is not sufficiently degassed in some cases. Furthermore, in the case where a liquid is, for instance, highly viscous, a bubble inside the hollow fiber degassing module is not broken by the shear stress of the liquid in some cases. Such an unbroken bubble tends to remain inside the hollow fiber degassing module. Such a remaining bubble may reduce the contact area of the hollow fiber membranes with the highly viscous liquid that is to be degassed, which may result in a problem in which the degassing performance of the hollow fiber degassing module becomes insufficient.

It is an object of an aspect of the present invention to provide a hollow fiber degassing module that can well degas and defoam a liquid and a method for well degassing and defoaming a liquid with such a hollow fiber degassing module.

Solution to Problem

According to an aspect of the present invention, a hollow fiber degassing module includes a cylinder, a first lid that seals one end of the cylinder and that has a liquid supply port, a second lid that seals the other end of the cylinder, a liquid inflow portion that includes a cylindrical main body and multiple openings formed in the outer circumferential surface of the cylindrical main body, the cylindrical main body being in communication with the liquid supply port inside the cylinder and extending in the axial direction of the cylinder, a hollow fiber membrane bundle that is provided inside the cylinder so as to cover the outer circumferential surface of the cylindrical main body and that includes multiple hollow fiber membranes, a liquid outlet that discharges the liquid inside the cylinder, a first air outlet that is provided to any one of the first lid and the second lid and connected to the inside of the multiple hollow fiber membranes, and a bubble outlet that is provided to the cylinder and that discharges a bubble in the liquid.

In such a hollow fiber degassing module, the liquid supplied to the cylindrical main body of the liquid inflow portion through the liquid supply port enters the cylinder via the openings. A dissolved gas and fine bubble contained in the liquid inside the cylinder enters the inside of the hollow fiber membranes. In particular, the liquid that has entered the cylinder is degassed when it passes through the hollow fiber membrane bundle. A gas or another matter that has entered the inside of the hollow fiber membranes is discharged from the first air outlet to the outside of the hollow fiber degassing module. A bubble existing in the liquid inside the cylinder and not removed by the hollow fiber membranes is discharged from the bubble outlet, which is different from the liquid outlet, to the outside of the hollow fiber degassing module. Hence, use of the hollow fiber degassing module enables the liquid to be well degassed and defoamed.

The bubble outlet may be positioned above the liquid outlet. In this case, the amount of the liquid to be discharged from the bubble outlet can be reduced, and the length of the flow channel of the liquid to the liquid outlet inside the cylinder is increased. This structure can well restrain bubbles from existing in the liquid that is to be discharged from the liquid outlet.

The bubble outlet may be positioned above the multiple openings. This structure enables a reduction in the backflow of bubbles in the liquid via the openings.

The hollow fiber degassing module may further include a second air outlet that is provided to the other one of the first lid and the second lid and connected to the inside of the multiple hollow fiber membranes. In this case, a gas that has entered the inside of the hollow fiber membranes can be well discharged.

The hollow fiber degassing module may further include a first sealing portion that fixes the liquid inflow portion and the hollow fiber membrane bundle on the first lid side in the axial direction and that separates a first space in the cylinder from a second space in the first lid, and a second sealing portion that fixes the liquid inflow portion and the hollow fiber membrane bundle on the second lid side in the axial direction and that separates the first space from a third space in the second lid, wherein each of the multiple openings, the liquid outlet, and the bubble outlet is in connection with the first space; and the first air outlet may be in connection with any one of the second space and the third space. In this case, the first and second sealing portions separate the space being in connection with the first air outlet from the first space being in connection with each of the multiple openings, the liquid outlet, and the bubble outlet. This structure can well restrain a gas that is to be discharged to the first air outlet from entering the first space.

The first sealing portion may be positioned above the second sealing portion in the axial direction, and the bubble outlet may be spaced apart from the first sealing portion in the axial direction. In this case, a region in which bubbles gather is formed between the first sealing portion and the bubble outlet inside the cylinder in the axial direction. A gas derived from the bubbles gathering in such a region enters the inside of the hollow fiber membranes exposed to this region, thereby being able to be well removed.

The first lid may be positioned above the second lid in the axial direction. In this case, the liquid supply port can supply the liquid to the cylindrical main body by gravity fall.

The liquid outlet may be provided to the cylinder. In this case, the degassed liquid can be well discharged regardless of the shapes of the first lid and second lid.

The liquid may have a viscosity of 1000 mPa·s or more. At this viscosity, a bubble in the liquid is hard to be broken, and use of only the hollow fiber membrane bundle tends to result in insufficient defoaming. The hollow fiber degassing module has the bubble outlet. Hence, even when a liquid to be processed by the hollow fiber degassing module has a viscosity of 1000 mPa·s or more, the liquid can be well degassed and defoamed.

A method for degassing a liquid with the hollow fiber degassing module includes degassing a liquid with a bubble in the liquid being discharged from the bubble outlet of the hollow fiber degassing module. The hollow fiber degassing module can be used to remove a dissolved gas contained in a liquid with a bubble in the liquid being discharged from the bubble outlet, so that the liquid can be well degassed and defoamed.

Advantageous Effects of Invention

According to an aspect of the present invention, there are provided a hollow fiber degassing module that enables a liquid to be well degassed and defoamed and a method for well degassing and defoaming a liquid with such a hollow fiber degassing module.

BRIEF DESCRIPTION OF DRAWINGS

FIGS. 3A and 38 are enlarged views partially illustrating the hollow fiber membrane bundle in FIG. 2.

DESCRIPTION OF EMBODIMENTS

The preferred embodiments of the present invention will now be described in detail with reference to the drawings. In the following description, the same elements or elements having the same function are denoted by the same reference sings, and the repeated description thereof is omitted.

Figure 1:
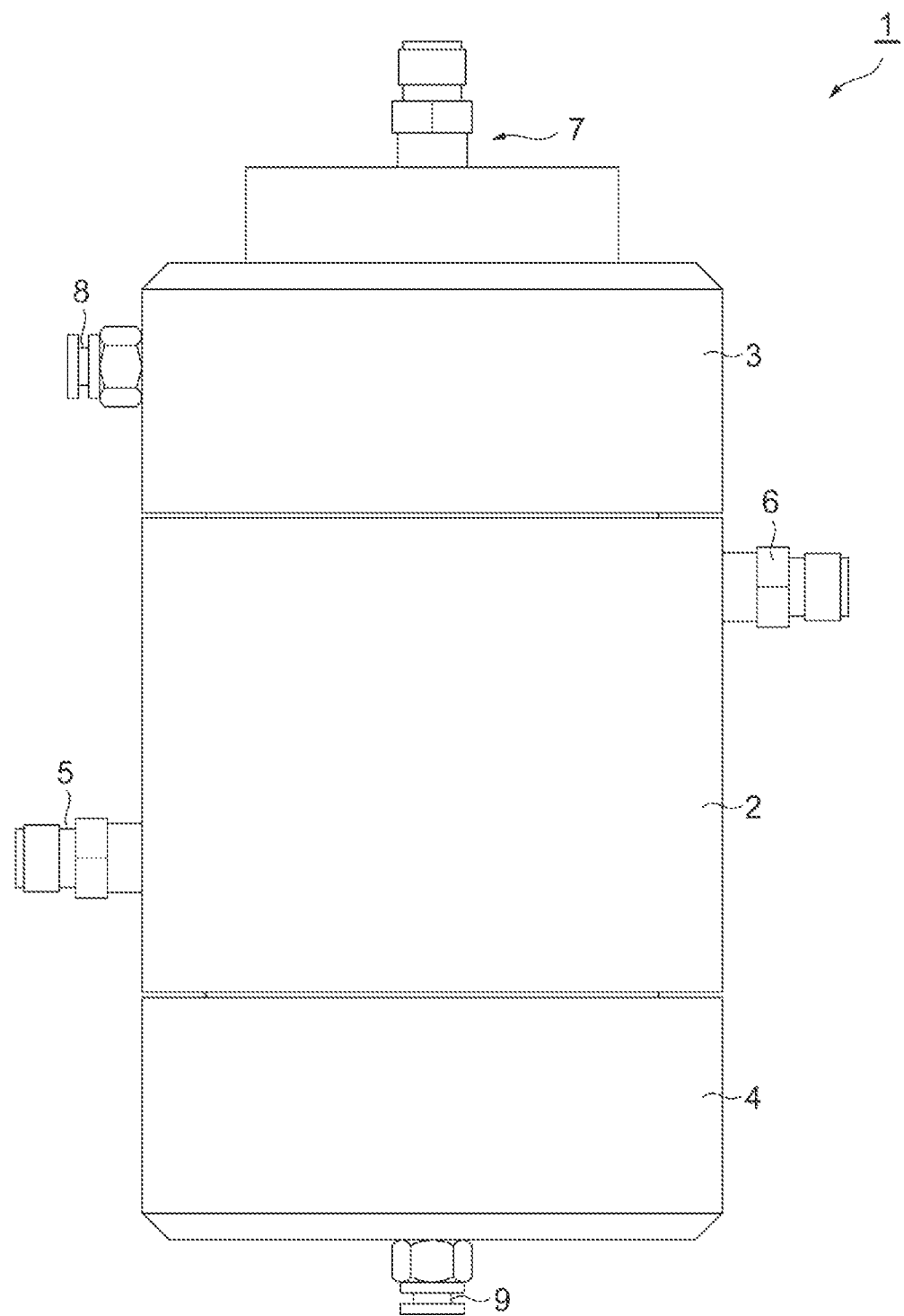
FIG. 1 is a front elevational view illustrating a hollow fiber degassing module according to an embodiment.
Figure 2:
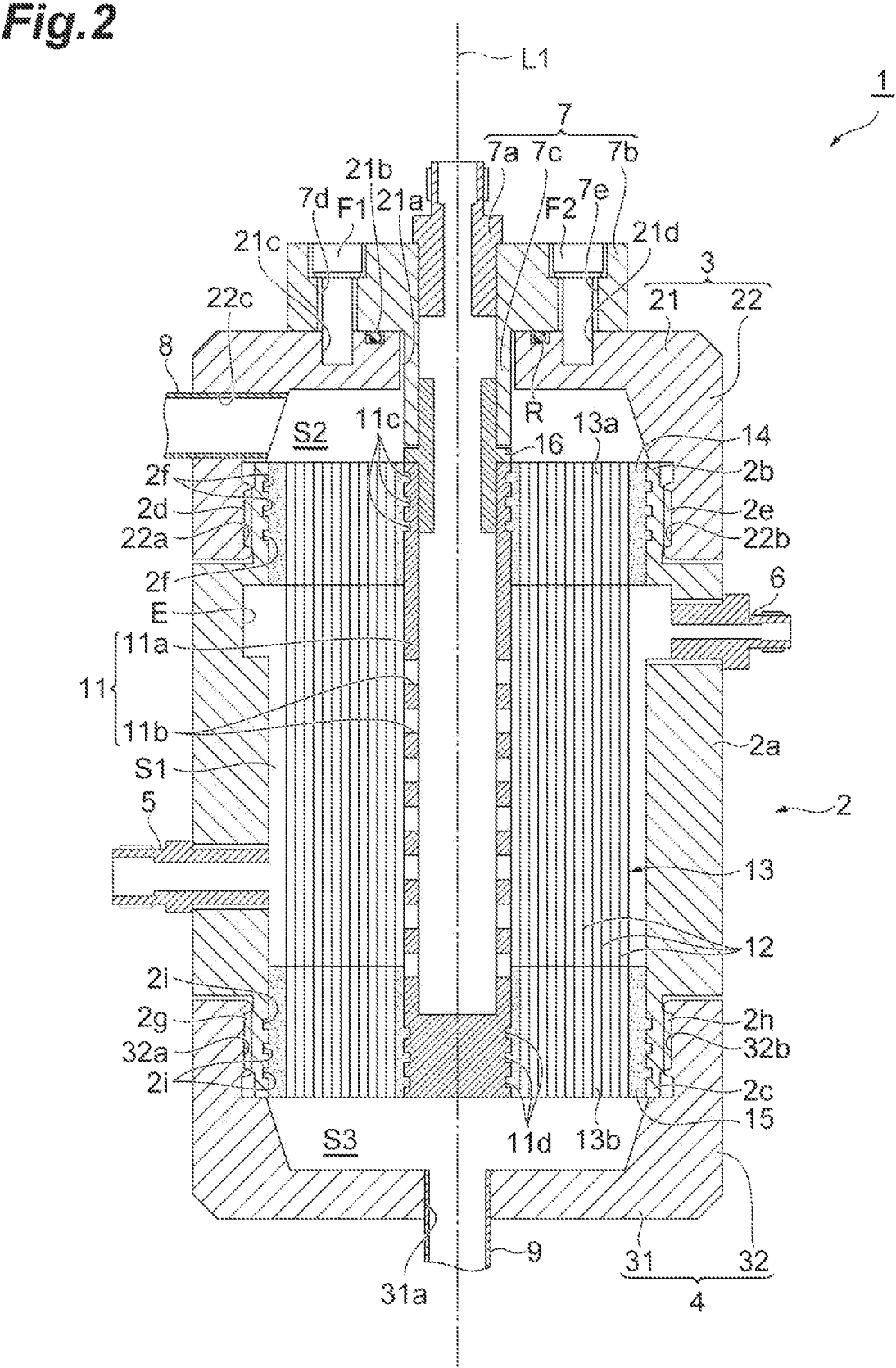
FIG. 2 is a schematic cross-sectional view illustrating the hollow fiber degassing module illustrated in FIG. 1.

FIG. 1 is a front elevational view illustrating a hollow fiber degassing module according to an embodiment. FIG. 2 is a schematic cross-sectional view illustrating the hollow fiber degassing module illustrated in FIG. 1. A hollow fiber degassing module 1 illustrated in FIGS. 1 and 2 degasses a liquid supplied thereinto and is therefore an external-perfusion-type degassing module. The hollow fiber degassing module 1 includes a cylinder 2 having a central part 2a and end parts 2b and 2c, a first lid 3 that seals the end part 2b of the cylinder 2, and a second lid 4 that seals the end part 2c of the cylinder 2. The central part 2a of the cylinder 2 has a liquid outlet 5 and a bubble outlet 6. The first lid 3 has a liquid supply port 7 and an air outlet 8 (first air outlet). The second lid 4 has an air outlet 9 (second air outlet). In this embodiment, the direction along the central axis L1 of the cylinder 2 is defined as the vertical direction (or axial direction). In this case, the end part 2b (and first lid 3) is positioned above the end part 2c (and second lid 4).

The hollow fiber degassing module 1 of the embodiment can degas any liquid provided that bubbles are readily generated in the liquid or that bubbles generated in the liquid are hard to be broken. Specific examples of the liquid include foaming liquids and highly viscous liquids. Examples of the foaming liquids include surfactants and liquids containing a surface-active substance. Examples of the highly viscous liquids include liquids having a specific viscosity at the temperature at which the liquids flow through the hollow fiber degassing module 1. In the embodiment, a highly viscous liquid is used.

In the highly viscous liquid, the lower limit of the specific viscosity at the above-mentioned temperature may be, for example, at any point greater than or equal to 100 mPa·s, any point greater than or equal to 500 mPa·s, or any point greater than or equal to 1000 mPa·s. The upper limit of the specific viscosity of the highly viscous liquid at the above-mentioned temperature may be, for instance, at any point less than or equal to 5000 mPa·s or any point less than or equal to 2000 mPa·s. The viscosity of the liquid at the above-mentioned temperature may be approximately 1600 mPa·s. In the highly viscous liquid, a combination of the above-mentioned ranges of the viscosity may be at any point ranging from 100 to 5000 mPa·s, from 500 to 5000 mPa, and from 1000 to 5000 mPa in view of preventing the intrusion of generated bubbles toward the liquid outlet and securing the flowability of the liquid. Furthermore, the combination of the ranges of the viscosity may be at any point ranging from 100 to 2000 mPa·s, from 500 to 2000 mPa, and from 1000 to 2000 mPa in view of processing the liquid as much as possible. The lower limit of the temperature at which the liquid flows through the hollow fiber degassing module 1 may be, for example, higher than the freezing point of the liquid. The upper limit of the temperature at which the liquid flows through the hollow fiber degassing module 1 may be, for instance, less than the heat distortion temperature of the resin used in hollow fiber membranes 12 that will be described later. For example, in the case where the resin used in the hollow fiber membranes is polyolefin, the temperature may be from 0° C. to 70° C., from 4° C. to 60° C., or room temperature (20° C.) to 45° C. The highly viscous liquid is, for instance, used as an ink, a resist, or a coating material.

The cylinder 2 is the main body of the hollow fiber degassing module 1 and has a substantially cylindrical shape. The inside of the central part 2a has no partitions, and each of the end parts 2b and 2c is opened. Accordingly, the cylinder 2 has a hollow structure. The cylinder 2 is, for example, formed of a resin in terms of easy production thereof. The cylinder 2 is, for instance, formed by injection molding. A region of the central part 2a in the vicinity of the end part 2b has a diameter enlarged part E. In other words, the diameter enlarged part E is at the upper end of the central part 2a. The diameter enlarged part E has the same outer diameter as the central part 2a but a larger inner diameter than the central part 2a. Hence, in a space S1 inside the cylinder 2 (first space), the cross-sectional area of the inner space defined by the diameter enlarged part E is larger than that of the inner space defined by the region other than the diameter enlarged part E.

The outer diameters of the end parts 2b and 2c are substantially the same as each other but smaller than the outer diameter of the central part 2a. The inner diameters of the end parts 2b and 2c are substantially the same as each other and also substantially the same as the inner diameter of the central part 2a except for the diameter enlarged part E. The outer circumferential surface of the end part 2b has nails 2d and 2e that lock the first lid 3. The inner circumferential surface of the end part 2b has a groove 2f that catches a sealing portion 14 that will be described later. Likewise, the outer circumferential surface of the end part 2c has nails 2g and 2h that lock the second lid 4, and the inner circumferential surface of the end part 2c has a groove 2i that catches a sealing portion 15 that will be described later.

The cylinder 2 accommodates a liquid inflow portion 11 that is in communication with the liquid supply port 7 of the first lid 3, a hollow fiber membrane bundle 13 that has multiple hollow fiber membranes 12 and that covers the outer circumferential surface of the liquid inflow part 11, and the sealing portions 14 and 15 that seal the space S1 and that fix the hollow fiber membrane bundle 13.

The liquid inflow portion 11 is a member formed of resin and introduces a liquid supplied from the liquid supply port 7 into the cylinder 2. The liquid inflow portion 11 has a cylindrical main body 11a extending in the vertical direction inside the central part 2a and multiple openings 11b formed in the outer circumferential surface of the cylindrical main body 11a. The liquid supply port 7, the inner space of the liquid inflow portion 11, and the space S1 are therefore in connection with each other; and the liquid supplied from the liquid supply port 7 enters the space S1 via the liquid inflow portion 11. The cylindrical main body 11a has a cylindrical shape, and the central axis of the cylindrical main body 11a alignments with the central axis of the cylinder 2. The length of the cylindrical main body 11a may be the same as or different from the length of the cylinder 2 in the vertical direction. In the embodiment, the above-mentioned length of the cylindrical main body 11a is substantially the same as that of the cylinder 2. The outer circumferential surface of the cylindrical main body 11a has a groove 11c that catches the sealing portion 14 that will be described later and a groove 11d that catches the sealing portion 15 that will be described later, as in the first lid 3 and the second lid 4.

The upper end of the cylindrical main body 11a is in connection with the liquid supply port 7 via a connection member 16. The lower end of the cylindrical main body 11a is closed. The outer diameter and thickness of the cylindrical main body 11a are, for example, appropriately determined to such an extent that the pressure loss of the liquid passing through the inside of the liquid inflow portion 11 does not increase. The connection member 16 connects the liquid supply port 7 to the liquid inflow portion 11 in a watertight manner and is, for example, formed of a resin.

Figure 3A:
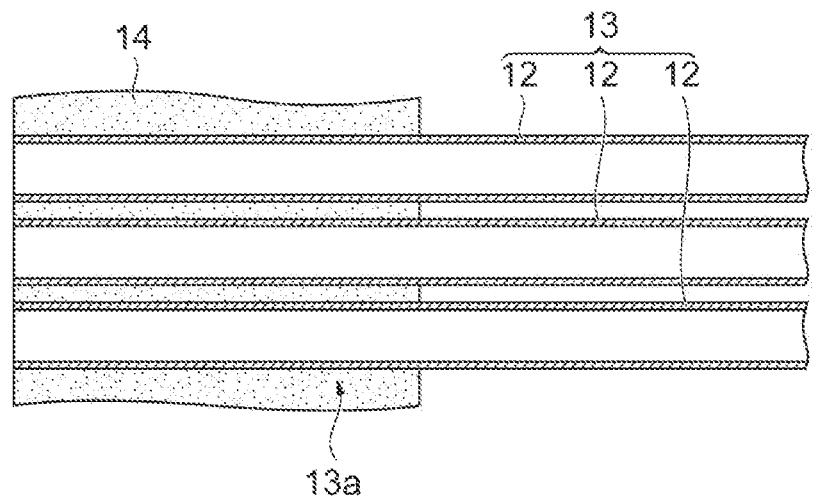
Figure 3B:
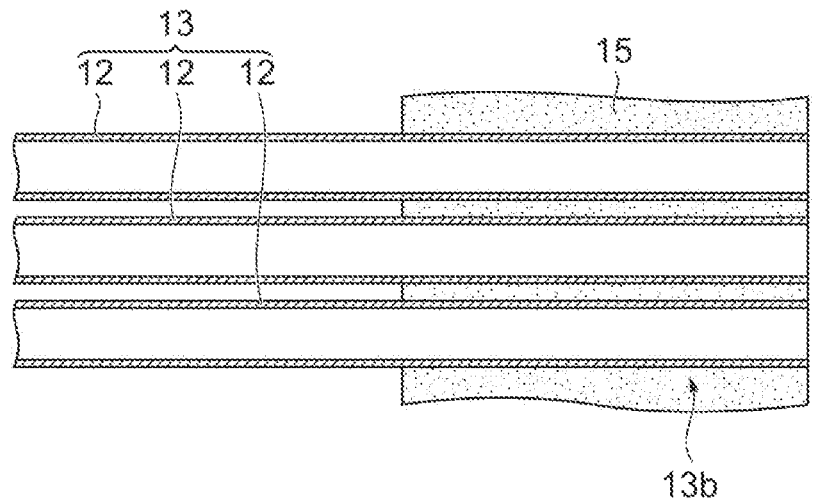

FIGS. 3A and 3B are enlarged views partially illustrating the hollow fiber membrane bundle in FIG. 2. With reference to FIGS. 3A and 3B, the hollow fiber membranes 12 are membranes that are in the form of hollow fibers that allow a gas to pass through but do not allow a liquid to penetrate. The hollow fiber membranes 12 extend along the vertical direction. In the vertical direction, each of the two ends of the hollow fiber membranes 12 is opened. The upper end of the hollow fiber membranes 12 is in connection with a space S2 (second space) inside the first lid 3. The lower end of the hollow fiber membranes 12 is in connection with a space S3 (third space) inside the second lid 4. The space S2 is separated from the inner space of the liquid supply port 7 in the first lid 3.

The hollow fiber membranes 12 are swollen by liquids. The material, shape, and form of the hollow fiber membranes 12 are not particularly limited. Examples of the material of the hollow fiber membranes 12 include polyolefin-based resins such as polypropylene and poly(4-methylpentene-1), silicon-based resins such as polydimethylsiloxane and copolymers thereof, and fluorine-based resins such as PTFE (polytetrafluoroethylene) and vinylidene fluoride. Examples of the shape of the hollow fiber membranes 12 (shape of the side wall) include a porous membrane, a microporous membrane, and a homogeneous membrane not having porosity (non-porous membrane). Examples of the form of the hollow fiber membranes 12 include a symmetrical membrane (homogeneous membrane) in which the chemical or physical structure of the whole membranes is homogeneous and an asymmetric membrane (heterogeneous membrane) in which the chemical or physical structure of the membranes differs in some parts of the membranes. The asymmetric membrane (heterogeneous membrane) is a membrane having a non-porous dense layer and pores. In this case, the dense layer may be formed at any part of the membrane, such as the surface layer of the membranes or the inside of the porous membranes. The heterogeneous membrane includes a composite membrane having a different chemical structure and a membrane having a multilayered structure such as a three-layered structure. In particular, a heterogeneous membrane using a poly(4-methylpentene-1) resin includes a dense layer for blocking a liquid and may be therefore used to degas a liquid other than water. In the case of a hollow fiber used in an external perfusion type, the dense layer may be formed on the outer circumferential surface of the hollow fiber.

The hollow fiber membrane bundle 13 is, for example, in the form of a hollow fiber membrane sheet (not illustrated) into which multiple hollow fiber membranes 12 have been woven together in parallel. In this case, for example, the hollow fiber membrane bundle 13 is formed of 30 to 90 hollow fiber membranes 12 per inch. The hollow fiber membrane bundle 13 surrounds and abuts on the outer circumferential surface of the cylindrical main body 11a and has a substantially cylindrical shape. Hence, the hollow fiber membranes 12 of the hollow fiber membrane bundle 13 are supported by the liquid inflow portion 11 from the inside in the radial direction. The hollow fiber membrane bundle 13 may or may not contact the inner circumferential surface of the cylinder 2. The length of the hollow fiber membrane bundle 13 in the vertical direction may be the same as or different from that of the liquid inflow portion 11. Such a length of the hollow fiber membrane bundle 13 may be, for example, smaller than that of the liquid inflow portion 11. In the embodiment, the liquid inflow portion 11 and the hollow fiber membrane bundle 13 have the same length. Thus, the upper end surface of the hollow fiber membrane bundle 13 corresponds to the upper end of the cylindrical main body 11a, and the lower end surface of the hollow fiber membrane bundle 13 corresponds to the lower end of the cylindrical main body 11a. The ratio of the length of the hollow fiber membrane bundle 13 to the inner diameter of the cylinder 2 is, for instance, from 6:1 to 1:1.

The sealing portion 14 (first sealing portion) is a sealing member provided so as to fill the inside of the end part 2b of the cylinder 2 and fixes the upper side of the liquid inflow portion 11 and the end part 13a of the hollow fiber membrane bundle 13 in the vertical direction. The sealing portion 14 catches the grooves 2f and 11c as described above, so that it is fixed to the inside of the end part 2b in the vertical direction. The sealing portion 14 is formed of a resin. Examples of the resin used in the sealing portion 14 include epoxy resins, urethane resins, ultraviolet curable resins, and polyolefin resins such as polyethylene and polypropylene. In the cross-sectional area of the end parts 2b that is vertical to the vertical direction, the sealing portion 14 fills the whole region except for the inside of the cylindrical main body 11a and the inside of the hollow fiber membranes 12. In other words, the sealing portion 14 fills the gaps between the hollow fiber membranes 12, between the hollow fiber membrane bundle 13 and the outer circumferential surface of the cylindrical main body 11a, and between the hollow fiber membrane bundle 13 and the inner circumferential surface of the end part 2b. The sealing portion 14 is therefore provided so as to separate the space S1 inside the cylinder 2 from the space S2 inside the first lid 3. Such a structure can prevent the liquid inside the space S1 from entering the space S2.

The sealing portion 15 (second sealing portion) is a sealing member provided so as to fill the inside of the end part 2c of the cylinder 2 and fixes the lower side of the liquid inflow portion 11 and the end part 13b of the hollow fiber membrane bundle 13 in the vertical direction. The sealing portion 15 catches the grooves 2i and 11d as described above, so that it is fixed to the inside of the end part 2c in the vertical direction. The sealing portion 15 is formed of the same resin as the sealing portion 14. In the cross-sectional area of the end parts 2c that is vertical to the vertical direction, the sealing portion 15 fills the whole region except for the inside of the cylindrical main body 11a and the inside of the hollow fiber membranes 12. In other words, the sealing portion 15 fills the gaps between the hollow fiber membranes 12, between the hollow fiber membrane bundle 13 and the outer circumferential surface of the cylindrical main body 11a, and between the hollow fiber membrane bundle 13 and the inner circumferential surface of the end part 2c. The sealing portion 15 is therefore provided so as to separate the space S1 inside the cylinder 2 from the space S3 inside the second lid 4. Such a structure can prevent the liquid inside the space S1 from entering the space S3.

The first lid 3 is a resin member that supports the liquid supply port 7 and that covers the end part 2b of the cylinder 2. The first lid 3 has a substantially disk-shaped top plate 21 and a side plate 22 that surrounds the periphery of the top plate 21. The top plate 21 has an opening 21a of which the center corresponds to the central axis L1, an annular groove 21b formed in the outer surface thereof so as to surround the opening 21a, and recesses 21c and 21d formed outside the groove 21b in the outer surface. Inside the annular groove 21b, a sealing ring R is provided to enhance the airtightness of the liquid supply port 7. The recesses 21c and 21d may be in the form of a female screw. The side plate 22 has grooves 22a and 22b that engage with the nails 2d and 2e of the cylinder 2, respectively, and a through hole 22c into which the air outlet 8 is inserted. The air outlet 8 is a member that discharges gas from the space S2 to the outside through a tube or another member. The gas to be discharged from the air outlets 8 and 9 is a gas contained the liquid that enters the inside of the hollow fiber membranes 12. The air outlet 8 is connected to the tube by mating with or being screwed to each other.

The liquid supply port 7 has a substantially cylindrical connection part 7a connected to the tube that supplies a liquid, a main body 7b that fixes the connection part 7a and that is attached to the first lid 3, and a tubular protrusion 7c that protrudes from the main body 7b so as to be inserted into the opening 21a and that is connected to the connection member 16. The main body 7b has openings 7d and 7e that align with recesses 3c and 3d in a state in which the protrusion 7c is inserted into the opening 21a, respectively. The connection part 7a is, for instance, connected to the tube by mating with or being screwed to each other. Into the openings 7d and 7e, fixing members F1 and F2, such as pins, can be inserted.

In the embodiment, the liquid supply port 7 is disposed on the outer surface of the top plate 21 of the first lid 3. The protrusion 7c is inserted into the opening 21a and in connection with the connection member 16. The fixing member F1 is inserted into both the opening 7d and the recess 21c, and the fixing member F2 is inserted into both the opening 7e and the recess 21d. Owing to this structure, the liquid supply port 7 is airtightly attached to the first lid 3 via the sealing ring R.

The second lid 4 is a resin member that covers the end part 2c of the cylinder 2. The second lid 4 has a substantially disk-shaped bottom plate 31 and a side plate 32 that surrounds the periphery of the bottom plate 31. The bottom plate 31 has an opening 31a of which the center corresponds to the central axis L1. Into the opening 31a, the air outlet 9 is inserted. The air outlet 9 is a member that discharges gas from the space S3 to the outside through a tube or another member. The gas to be discharged from the air outlet 9 is a gas contained in the liquid that enters the inside of the hollow fiber membranes 12. The air outlet 9 is, for example, connected to the tube by mating with or being screwed to each other. The side plate 32 has grooves 32a and 32b that engage with the nails 2g and 2h of the cylinder 2, respectively.

The liquid outlet 5 is a member that penetrates through the side wall of the central part 2a of the cylinder 2 and that discharges a liquid from the space S1 to the outside through a tube or another member. The liquid outlet 5 is positioned on the end-part-2c side of the central part 2a and between the sealing portions 14 and 15 in the vertical direction. The liquid outlet 5 is, for example, connected to the tube by mating with or being screwed to each other. The liquid to be discharged from the liquid outlet 5 is a liquid that has entered the space S1 from the liquid inflow portion 11 and been degassed with the hollow fiber membrane bundle 13.

The bubble outlet 6 is a member that penetrates through the side wall of the central part 2a of the cylinder 2 and that discharges gas (mainly bubble) from the space S1 to the outside through a tube or another member. The bubble outlet 6 is positioned on the end-part-2b side of the central part 2a and between the sealing portions 14 and 15 in the vertical direction (specifically, in diameter enlarged part E). The bubble outlet 6 is, for example, connected to the tube by mating with or being screwed to each other. The gas to be discharged from the bubble outlet 6 is a gas or bubble that has not entered any of the hollow fiber membranes 12 and that exists in the space S1. In other words, not only a bubble but also gas is discharged from the bubble outlet 6. A liquid is also discharged from the bubble outlet 6.

Since gases are lighter than liquids, the bubble outlet 6 may be provided above the liquid outlet 5. In such a structure, the amount of the liquid discharged from the bubble outlet 6 is greatly reduced than the amount of the liquid discharged from the liquid outlet 5. The bubble outlet 6 is provided so as to be spaced apart from the sealing portion 14 in the vertical direction. In this structure, bubbles and a region in which a gas derived from the bubbles remains exist in the space S1 between the sealing portion 14 and the bubble outlet 6. In the embodiment, such a region corresponds to the position of the diameter enlarged part E in the space S1, and part of the hollow fiber membrane bundle 13 is exposed to this region. The bubble outlet 6 may be disposed above the multiple openings 11*b* of the liquid inflow portion 11 or may be disposed above both the liquid outlet 5 and the openings 11*b* of the liquid inflow portion 11.

A method for degassing a liquid with the hollow fiber degassing module 1 will now be described.

A liquid externally supplied to the liquid supply port 7 enters the liquid inflow portion 11 inside the cylinder 2. The liquid inside the liquid inflow portion 11 enters the space S1 through the multiple openings 11*b*. The liquid inside the space S1 enters the gaps between the hollow fiber membranes 12 and then flows toward the inner circumferential surface of the cylinder 2 through the gaps. In other words, the liquid that has entered the space S1 flows toward the outside of the hollow fiber membrane bundle 13. In this process, the vacuum pump or another device is operated to suction air inside the spaces S2 and S3 from the air outlets 8 and 9, so that pressure inside of the hollow fiber membranes 12 is reduced. Then, when the liquid passes through the hollow fiber membrane bundle 13, gas dissolved in the liquid (dissolved gas) and fine bubbles in the liquid are drawn to the inside of the hollow fiber membranes 12. Through this process, the liquid is degassed. The fine bubbles have a diameter that enables the bubbles to pass through the pores of the hollow fiber membranes 12.

The liquid contains bubbles that have not removed by the hollow fiber membranes 12. Such bubbles are likely to gather on the upper side of the space S1 (specifically, region corresponding to the diameter enlarged part E in the space S1) because of the effect of specific gravity relative to the liquid. The gas derived from the bubbles gathering in this region enters the hollow fiber membranes 12 and is then removed. The bubbles are discharged from the bubble outlet 6 to the outside. This structure enables removal of bubbles that are contained in the liquid and that have not entered the inside of the hollow fiber membranes 12, so that the liquid can be degassed with the hollow fiber membranes 12 used in the hollow fiber degassing module 1 while the bubbles in the liquid are discharged from the bubble outlet 6 of the hollow fiber degassing module 1. The liquid degassed and defoamed owing to the bubble outlet 6 and the air outlets 8 and 9 is discharged from the liquid outlet 5 to the outside.

In the hollow fiber degassing module 1 of the embodiment, the gas and fine bubbles dissolved in the liquid that has flowed into the cylinder 2 enter the inside of the hollow fiber membranes 12 in this manner. In particular, the liquid that has flowed into the space S1 of the cylinder 2 is degassed when it passes through the hollow fiber membrane bundle 13. The gas or another matter that has entered the inside of the hollow fiber membranes 12 is discharged from the air outlet 8 to the outside of the hollow fiber degassing module 1. Bubbles existing in the liquid inside the space S1 of the cylinder 2 but not removed by the hollow fiber membranes. 12 are discharged from the bubble outlet 6, which is different from the liquid outlet 5, to the outside of the hollow fiber degassing module 1. Accordingly, use of the hollow fiber degassing module 1 enables gas dissolved in a liquid to be removed with bubbles in the liquid being discharged from the bubble outlet 6; thus, the liquid can be well degassed and defoamed.

The bubble outlet 6 is provided above the liquid outlet 5. This structure enables a reduction in the amount of a liquid that is to be discharged from the bubble outlet 6 and an increase in the length of the flow channel of the liquid to the liquid outlet 5 in the space S1 of the cylinder 2. Accordingly, bubbles can be well restrained from existing in the liquid that is to be discharged from the liquid outlet 5.

The bubble outlet 6 is provided above the multiple openings 11*b*. This structure can restrain bubbles in the liquid from flowing back through the openings 11*b*.

The hollow fiber degassing module 1 has the air outlet 9 formed in the second lid 4 and being in connection with the inside of the multiple hollow fiber membranes 12. Thus, the gas that has entered the inside of the hollow fiber membranes 12 can be well discharged.

The hollow fiber degassing module 1 has the sealing portion 14 that fixes the liquid inflow portion 11 and the hollow fiber membrane bundle 13 on the first-lid-3 side in the vertical direction and that separates the space S1 in the cylinder 2 from the space S2 in the first lid 3 and the sealing portion 15 that fixes the liquid inflow portion 11 and the hollow fiber membrane bundle 13 on the second-lid-4 side in the vertical direction and that separates the space S1 from the space S3 in the second lid 4. Furthermore, the multiple openings lib, the liquid outlet 5, and the bubble outlet 6 are each in connection with the space S1; the air outlet 8 is in connection with the space S2; and the air outlet 9 is in connection with the space S3. The sealing portions 14 and 15 therefore separate the space S1 connected to each of the multiple openings lib, the liquid outlet 5, and the bubble outlet 6; the space S2 connected to the air outlet 8; and the space S3 connected to the air outlet 9 from one another. Thus, gas to be discharged from the air outlets 8 and 9 can be well restrained from entering the space S1.

The bubble outlet 6 is spaced apart from the sealing portion 14 in the vertical direction. Hence, a region in which bubbles gather is formed inside the cylinder 2 between the sealing portion 14 and the bubble outlet 6 in the vertical direction. The gas derived from the bubbles staying in such a region enters the hollow fiber membranes 12 exposed to this region and then can be further well removed. The diameter enlarged part E enables such a gas remaining region to exist even when the distance between the bubble outlet 6 and the sealing portion 14 is decreased.

The first lid 3 is disposed above the second lid 4 in the vertical direction. Thus, the liquid supply port 7 can supply a liquid to the cylindrical main body 11*a* by gravity fall.

The liquid outlet 5 is provided to the cylinder 2. This structure enables a degassed liquid to be well discharged regardless of, for example, the shapes of the first lid 3 and second lid 4.

The viscosity of the liquid may be 1000 mPa·s or more. At this viscosity, bubbles in the liquid are hard to be broken by the shear stress of the liquid, and defoaming only with the hollow fiber membrane bundle 13 is likely to be insufficient. Since the hollow fiber degassing module 1 has the bubble outlet 6, unbroken bubbles are discharged from the bubble outlet 6 even when a liquid to be processed by the hollow fiber degassing module 1 has a viscosity of 1000 mPa·s or more; hence, the liquid can be well degassed and defoamed. In other words, in the case where the liquid supplied to the hollow fiber degassing module 1 is highly viscous, such a liquid can be particularly well degassed and defoamed.

The hollow fiber degassing module and method for degassing a liquid with the hollow fiber degassing module according to an aspect of the present invention are not limited to the above-mentioned embodiments. In the hollow fiber degassing module 1 of the above-mentioned embodiment, for example, the direction in which the central axis L1 extends is not limited to the vertical direction. The central axis L1 may extend in the direction that intersects the vertical direction or that is orthogonal thereto. In this case, the first lid 3 does not need to be positioned above the cylinder 2 and the second lid 4. In addition, the liquid supply port 7 does not need to be positioned above the cylinder 2 and the second lid 4.

In the above-mentioned embodiment, the first lid 3 may be positioned below the second lid 4. In other words, the cylinder 2 may be in the reverse form to the embodiment. In this case, the diameter enlarged part is provided near the end part 2c, and the bubble outlet 6 is provided so as to penetrate through the diameter enlarged part. The diameter enlarged part E in the embodiment does not necessarily need to be provided.

In the above-mentioned embodiment, the liquid outlet 5 and the bubble outlet 6 may be provided at any position on the central part 2a of the cylinder 2. The liquid outlet 5 may be, for instance, positioned above the bubble outlet 6. The liquid outlet 5 may be at any part other than the central part 2a. The liquid outlet 5 may be, for example, provided to the first lid 3 or the second lid 4.

In the above-mentioned embodiment, the air outlets 8 and 9 may be connected to vacuum pumps to suction air inside the spaces S2 and S3, respectively. In this case, the pressure inside the hollow fiber membranes 12 is reduced, and the liquid inside the space S1 can be well degassed through the hollow fiber membranes 12.

In the above-mentioned embodiment, the liquid supplied to the hollow fiber degassing module 1 does not need to have a viscosity of 1000 mPa·s or more. In particular, the liquid supplied to the hollow fiber degassing module 1 does not need to be highly viscous. The liquid does not need to be a foaming liquid. Furthermore, in the case where the liquid is reactive to light, such as ultraviolet light, each of the cylinder 2, the first lid 3, and the second lid 4 may be painted in a color that does not allow light to pass (for example, black).

The hollow fiber degassing module 1 of the above-mentioned embodiment may have a sealing ring or another member to enhance the airtightness between the cylinder 2 and the first lid 3. In addition, the hollow fiber degassing module 1 may have a sealing ring or another member to enhance the airtightness between the cylinder 2 and the second lid 4.

EXAMPLES

The present invention will now be described further in detail with reference to Examples but is not limited thereto.

A hollow fiber degassing module to be used in Examples that will be described later was produced, and the degassing performance and defoaming performance thereof were analyzed in a performance evaluating line illustrated in FIG. 4.

(Performance Evaluating Line)

Figure 4:
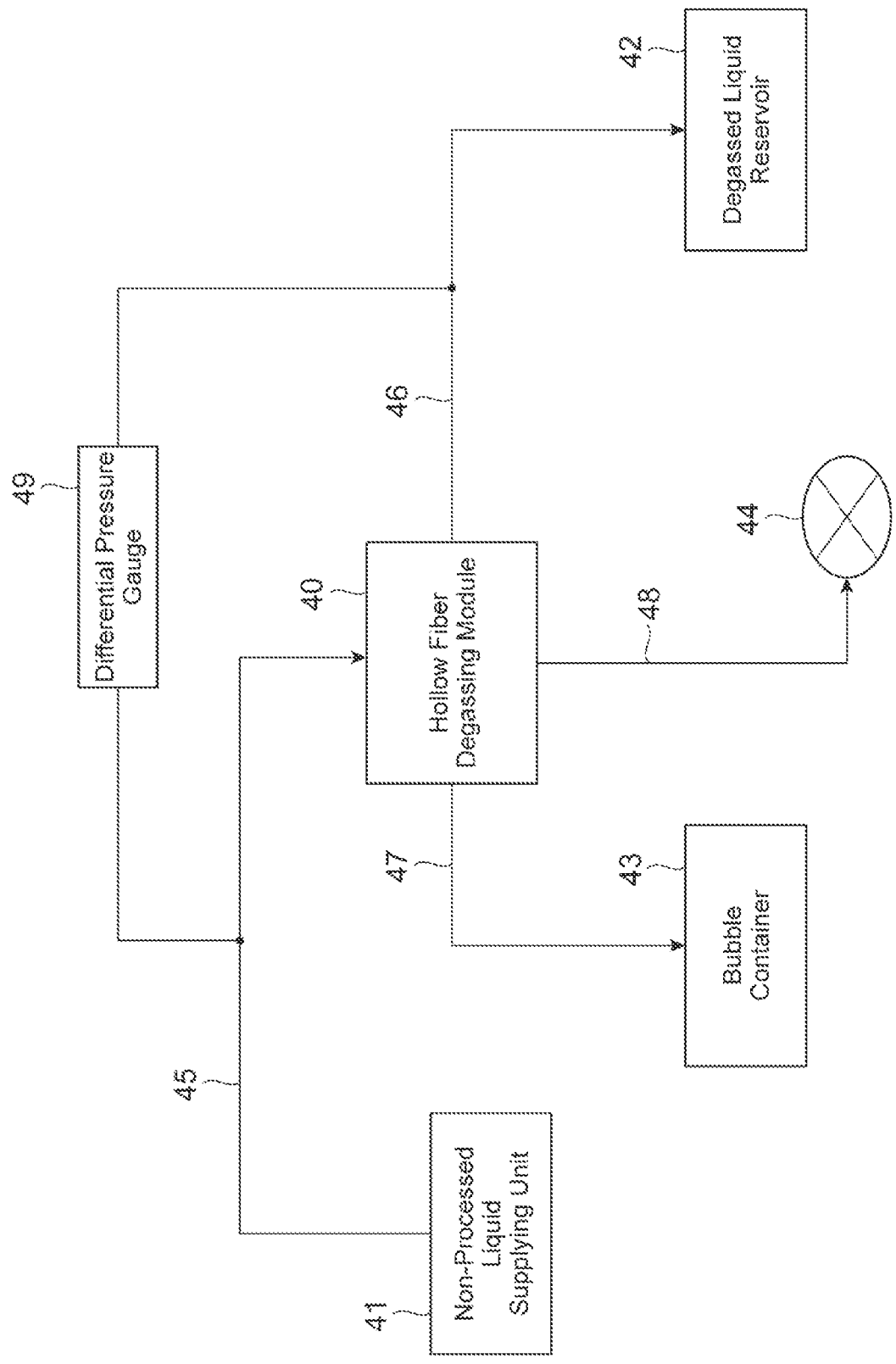
FIG. 4 is a block diagram illustrating a performance evaluating line used in Examples.

The performance evaluation line illustrated in FIG. 4 is a line that has a combination of a hollow fiber degassing module 40 having the same structure as the hollow fiber degassing module 1 of the above-mentioned embodiment, a non-processed liquid supplying unit 41 that transmits the liquid by application of pressure, a degassed liquid reservoir 42, a bubble container 43, and a vacuum pump 44. In particular, the non-processed liquid supplying unit 41 is connected to the liquid supply port of the hollow fiber degassing module 40 via the tube 45 (see FIGS. 1 and 2). Likewise, the degassed liquid reservoir 42 is connected to the liquid outlet of the hollow fiber degassing module 40 via a tube 46, the bubble container 43 is connected to the bubble outlet of the hollow fiber degassing module 40 via a tube 47, and the vacuum pump 44 is connected to the air outlet of the hollow fiber degassing module 40 via a tube 48 (see also FIGS. 1 and 2). In addition, a differential pressure gauge 49 is attached to the tubes 45 and 46.

In the hollow fiber degassing module 40, SEPAREL EF-002A manufactured by DIC Corporation was used as the base of the module, and a bubble outlet was newly formed to produce the module. The hollow fiber degassing module 40 was produced as follows.

A cylinder formed of polyphenylene ether; including the same liquid outlet and bubble outlet as the above-mentioned embodiment; and having an inner diameter of 77 mmφ, an outer diameter of 89 mmφ, and a length of 230 mm was prepared. Then, 72,000 inhomogeneous hollow fiber membranes formed of poly-4-methylpentene-1 and having an inner diameter of 100 μm, an outer diameter of 190 μm, and a length of 230 mm were formed into a bundle and put into the cylinder. Both the ends of the cylinder were subsequently sealed with a curable resin composition, and the curable resin composition fixed the hollow fiber membrane bundle to the inside of the cylinder. Specifically, the curable resin composition was injected into one end of the cylinder at normal temperature and left to stand for approximately three hours for curing. Then, the curable resin composition was injected into the other end of the cylinder at normal temperature and similarly left to stand for approximately three hours for curing. The resulting cylinder was subsequently left to stand for 15 hours at 60° C. to further cure the curable resin compositions injected into both the ends of the cylinder. In each of the two ends of the hollow fiber membrane bundle, the part that had been tightly fixed owing to the cured product of the curable resin composition was cut in the direction orthogonal to the length direction of the fiber bundle, thereby forming openings in each of the hollow fiber membranes. Then, lids formed of polyphenylene ether were individually attached to the ends of the cylinder having the hollow fiber membrane bundle with the openings, thereby producing an external-perfusion-type hollow fiber membrane degassing module having the same form as the hollow fiber degassing module illustrated in FIG. 2.

The curable resin composition was a composition mainly containing a base resin and a curing agent. The base resin was a bisphenol epoxy resin manufactured by Mitsubishi Chemical Corporation (trade name "Epikote 828"), and the curing agent was 1,3-bis(aminomethyl)cyclohexane.

The non-processed liquid supplying unit 41 stored a highly viscous liquid manufactured by DIC Corporation (trade name: EX-08802, viscosity: 1600 mPa·s). The temperature of this liquid was adjusted to be from 23° C. to 27° C. The vacuum pump 44 was DTC-41K manufactured by ULVAC, Inc. Each of the tubes 45, 46, and 48 had an inner diameter of 5 mm, and the tube 47 had an inner diameter of 3 mm. The differential pressure gauge 49 measured the difference in pressure between the liquid flowing inside the tube 45 and a degassed liquid flowing inside the tube 46 (pressure loss) and was a pressure sensor (trade name: VHR3) manufactured by VALCOM Co., LTD.

Example 1

A liquid inside the non-processed liquid supplying unit 41 was stirred, and air was supplied thereto. This procedure gave visually recognizable abundant bubbles to the liquid inside the non-processed liquid supplying unit 41. The liquid was supplied from the non-processed liquid supplying unit 41 to the hollow fiber degassing module 40 over an hour at a flow rate of 30 ml/min. Air was suctioned by the vacuum pump 44 during the supply of the liquid to control the pressure in the space in the tube 48 and in the cylinder being in communication with the tube 48 to be approximately 5.3 kPa (approximately 40 Torr). After the performance evaluating line was driven (namely, one hour after the liquid was started to be supplied), the amount of air dissolved in the liquid reserved in the degassed liquid reservoir 42 was measured with a dissolved oxygen meter manufactured by Central Kagaku Corp. (DO meter for organic solvents, trade name: US-12-SOL). In the supply of the liquid, the pressures inside the tubes 45 and 46 were measured, and differential pressure therebetween (pressure loss) was calculated. Table 1 shows the pressures inside the tubes 45 and 46 and the differential pressure in Example 1. The liquid reserved in the degassed liquid reservoir 42 in Example 1 was visually observed and was found to have no bubbles.

Example 2

Except that the flow rate of the liquid was changed to be 20 ml/min, the performance evaluating line was driven as in Example 1, and the amount of oxygen dissolved in the liquid reserved in the degassed liquid reservoir 42 was measured. In the supply of the liquid, the pressures inside the tubes 45 and 46 were measured, and differential pressure therebetween was calculated. Table 1 shows the pressures inside the tubes 45 and 46 and the differential pressure in Example 2. The liquid reserved in the degassed liquid reservoir 42 in Example 2 was visually observed and was found to have no bubbles as in Example 1.

Example 3

Except that the flow rate of the liquid was changed to be 10 ml/min, the performance evaluating line was driven as in Example 1, and the pressures inside the tubes 45 and 46 were measured. Table 1 shows the pressures inside the tubes 45 and 46 and the differential pressure in Example 3. The liquid reserved in the degassed liquid reservoir 42 in Example 3 was visually observed and was found to have no bubbles as in Examples 1 and 2.

Example 4

Except that the flow rate of the liquid was changed to be 5 ml/min, the performance evaluating line was driven as in Example 1, and the pressures inside the tubes 45 and 46 were measured. Table 1 shows the pressures inside the tubes 45 and 46 and the differential pressure in Example 4. The liquid reserved in the degassed liquid reservoir 42 in Example 2 was visually observed and was found to have no bubbles as in Examples 1 to 3.

TABLE 1

| | Flow rate (ml/L) | Pressure inside tube 45 (kPa) | Pressure inside tube 46 (kPa) | Differential pressure (pressure loss) (kPa) |
|---|---|---|---|---|
| Example 1 | 30 | 90 | 20 | 70 |
| Example 2 | 20 | 60 | 12 | 48 |
| Example 3 | 10 | 27 | 4 | 23 |
| Example 4 | 5 | 13 | 0 | 13 |

(Amount of Dissolved Oxygen)

In Example 1, the amount of oxygen dissolved in the liquid reserved in the degassed liquid reservoir 42 was 1.2 mg/L. In Example 2, the amount of oxygen dissolved in the liquid reserved in the degassed liquid reservoir 42 was 1.1 mg/L. These results shows that the amount of the oxygen dissolved in the degassed liquid tends not to depend on the amount of the liquid supplied to the hollow fiber degassing module.

(Pressure Loss)

Figure 5:
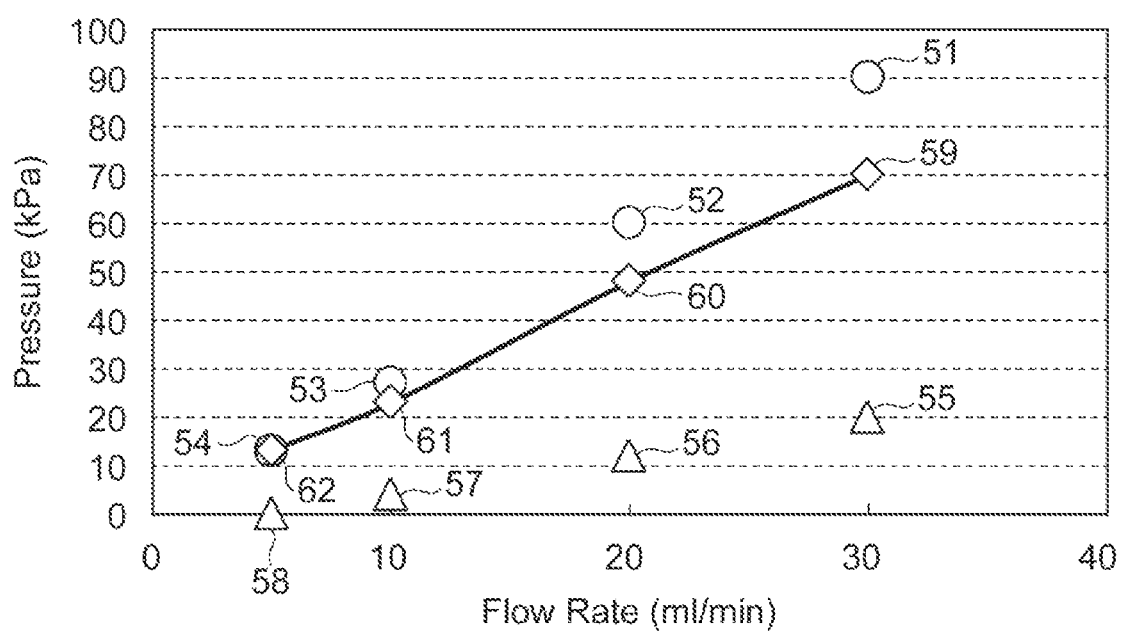
FIG. 5 is a graph in which results in Examples in Table 1 are plotted.

FIG. 5 is a graph in which the results in Table 1 are plotted. In FIG. 5, the horizontal axis indicates the flow rate of the liquid supplied to the hollow fiber degassing module 40, and the vertical axis indicates pressure. In FIG. 5, circular plots 51 to 54 indicate the pressure inside the tube 45 in Examples 1 to 4, triangle plots 55 to 58 indicate the pressure inside the tube 46 in Examples 1 to 4, and circular plots 59 to 62 indicates differential pressure (pressure loss) in Examples 1 to 4, respectively. As illustrated in FIG. 5, the pressure loss in Examples 1 to 4 increased in response to an increase in the flow rate of the liquid supplied to the hollow fiber degassing module 40.

REFERENCE SIGNS LIST

1 . . . Hollow fiber degassing module, 2 . . . Cylinder, 2a . . . Central part, 2b, 2c . . . End part, 3 . . . First lid, 4 . . . Second lid, 5 . . . Liquid outlet, 6 . . . Bubble outlet, 7 . . . Liquid supply port, 8 . . . Air outlet (first air outlet), 9 . . . Air outlet (second air outlet), 11 . . . Liquid inflow portion, 1a . . . Cylindrical main body, 11b . . . Opening, 12 . . . Hollow fiber membrane, 13 . . . Hollow fiber membrane bundle, 14 . . . Sealing portion (first sealing portion), 15 . . . Sealing portion (second sealing portion), E . . . Diameter enlarged part, L1 . . . Central axis, S1 . . . Space (first space), S2 . . . Space (second space), S3 . . . space (third space)

The invention claimed is:

1. A hollow fiber degassing module comprising:
   a cylinder;
   a first lid that seals one end of the cylinder and that has a liquid supply port;
   a second lid that seals the other end of the cylinder;
   a liquid inflow portion that includes a cylindrical main body and a plurality of openings formed in the outer circumferential surface of the cylindrical main body, the cylindrical main body being in communication with the liquid supply port inside the cylinder and extending in the axial direction of the cylinder;
   a hollow fiber membrane bundle that is provided inside the cylinder so as to cover the outer circumferential surface of the liquid inflow portion and that includes a plurality of hollow fiber membranes;
   a liquid outlet that discharges the liquid inside the cylinder;
   a first air outlet that is provided to any one of the first lid and the second lid and connected to the inside of the plurality of the hollow fiber membranes; and
   a bubble outlet that is provided to the cylinder and that discharges a bubble in the liquid.

2. The hollow fiber degassing module according to claim 1, wherein the bubble outlet is positioned above the liquid outlet.

3. The hollow fiber degassing module according to claim 1, wherein the bubble outlet is positioned above the plurality of the openings.

4. The hollow fiber degassing module according to claim 1, further comprising a second air outlet that is provided to the other one of the first lid and the second lid and connected to the inside of the plurality of the hollow fiber membranes.

5. The hollow fiber degassing module according to claim 1, further comprising:
   a first sealing portion that fixes the liquid inflow portion and the hollow fiber membrane bundle on the first lid side in the axial direction and that separates a first space in the cylinder from a second space in the first lid; and
   a second sealing portion that fixes the liquid inflow portion and the hollow fiber membrane bundle on the second lid side in the axial direction and that separates the first space from a third space in the second lid, wherein
   the plurality of the openings, the liquid outlet, and the bubble outlet are each in connection with the first space, and
   the first air outlet is in connection with any one of the second space and the third space.

6. The hollow fiber degassing module according to claim 5, wherein the first sealing portion is positioned above the second sealing portion in the axial direction, and
   the bubble outlet is spaced apart from the first sealing portion in the axial direction.

7. The hollow fiber degassing module according to claim 1, wherein the first lid is positioned above the second lid.

8. The hollow fiber degassing module according to claim 1, wherein the liquid outlet is provided to the cylinder.

9. The hollow fiber degassing module according to claim 1, wherein the liquid has a viscosity of 1000 mPa·s or more.

10. A method for degassing a liquid with the hollow fiber degassing module according to claim 1, the method comprising degassing a liquid with a bubble in the liquid being discharged from the bubble outlet of the hollow fiber degassing module.

11. The hollow fiber degassing module according to claim 1, wherein
   the inside of the cylinder has a diameter enlarged part formed in the upper end of the first space,
   the bubble outlet is provided to the diameter enlarged part,
   the first space has a first region corresponding to the diameter enlarged part and a second region other than the first region, and
   the first region has a larger cross-sectional area than the second region.

* * * * *